US005277961A

United States Patent [19]

Hite

[11] Patent Number: 5,277,961

[45] Date of Patent: Jan. 11, 1994

[54] WALL COVERING

[76] Inventor: Joanne S. Hite, 126 Mirror Lake Dr., Williamsburg, Va. 23185

[21] Appl. No.: 808,467

[22] Filed: Dec. 16, 1991

[51] Int. Cl.$^{5}$ .............................................. B32B 9/00

[52] U.S. Cl. ...................................... 428/195; 428/46; 428/47; 428/85; 428/142; 428/172; 428/203; 428/204; 428/207; 428/304.4; 428/904.4; 428/913

[58] Field of Search ..................... 428/904.4, 195, 913, 428/206, 46, 47, 85, 142, 172, 203, 204, 207, 304.4

[56] References Cited

U.S. PATENT DOCUMENTS

| | | | |
|---|---|---|---|
| 3,920,870 | 10/1975 | Ackerman et al. | 428/904.4 |
| 4,122,224 | 10/1978 | Brewer et al. | 428/159 |
| 4,693,926 | 9/1987 | Kowalski et al. | 428/204 |
| 4,756,951 | 7/1988 | Wang et al. | 428/904.4 |
| 4,797,315 | 1/1989 | Balmer et al. | 428/167 |
| 4,804,572 | 2/1989 | Bodrogi | 428/195 |
| 5,015,516 | 5/1991 | Lussi et al. | 428/143 |

*Primary Examiner*—Patrick J. Ryan
*Assistant Examiner*—Abraham Bahta
*Attorney, Agent, or Firm*—Leon Gilden

[57] ABSTRACT

A wall covering is arranged to provide for opaque panels mounted with transparent panels, and wherein the opaque panels are arranged to include transparent windows therethrough to permit viewing of a wall surface accommodating the wall covering structure. A modification of the invention includes vertical reservoirs arranged in adjacency and coextensively relative to one another to define the panels, wherein the reservoirs are arranged for the reception and subsequent selective drainage of contrastingly colored fluids therewithin. Photochromic panel members are arranged for positioning as desired on the outer surface of the reservoirs.

3 Claims, 4 Drawing Sheets

WALL COVERING

BACKGROUND OF THE INVENTION

1. Field of the Invention

The field of invention relates to wall covering structure, and more particularly pertains to a new and improved wall covering wherein the same is arranged to effect covering and modification of existing wall surfaces.

2. Description of the Prior Art

Coverings of various types are utilized throughout the prior art to effect the covering of existing structure, wherein various prior art examples include various coverings arranged for the complete covering of prior wall surfaces. The instant invention attempts to overcome deficiencies of the prior art by permitting the prior wall covering surfaces to be viewed through the invention to utilize the prior wall covering surface in combination with the covering of the instant invention to provide for the cumulative viewing of the existing wall coloration in addition to the wall covering coloration of the instant invention.

SUMMARY OF THE INVENTION

In view of the foregoing disadvantages inherent in the known types of wall covering structure now present in the prior art, the present invention provides a wall covering wherein the same is arranged to utilize transparent portions in combination with opaque portions for the covering of existing wall surfaces. As such, the general purpose of the present invention, which will be described subsequently in greater detail, is to provide a new and improved wall covering which has all the advantages of the prior art wall covering structure and none of the disadvantages.

To attain this, the present invention provides a wall covering arranged to provide for opaque panels mounted with transparent panels, and wherein the opaque panels are arranged to include transparent windows therethrough to permit viewing of a wall surface accommodating the wall covering structure. A modification of the invention includes vertical reservoirs arranged in adjacency and coextensively relative to one another to define the panels, wherein the reservoirs are arranged for the reception and subsequent selective drainage of contrastingly colored fluids therewithin. Photochromic panel members are arranged for positioning as desired on the outer surface of the reservoirs.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wall covering which has all the advantages of the prior art wall covering structure and none of the disadvantages.

It is another object of the present invention to provide a new and improved wall covering which may be easily and efficiently manufactured and marketed.

It is a further object of the present invention to provide a new and improved wall covering which is of a durable and reliable construction.

An even further object of the present invention is to provide a new and improved wall covering which is susceptible of a low cost of manufacture with regard to both materials and labor, and which accordingly is then susceptible of low prices of sale to the consuming public, thereby making such wall coverings economically available to the buying public.

Still yet another object of the present invention is to provide a new and improved wall covering which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to an forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
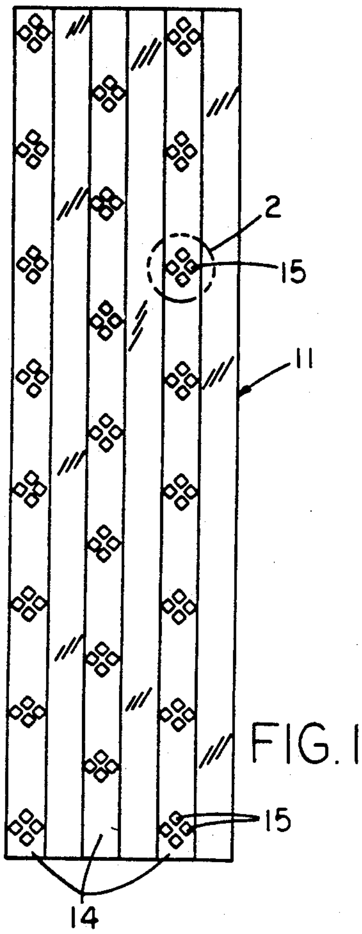
FIG. 1 is an orthographic view of the wall covering of the invention.
Figure 2:
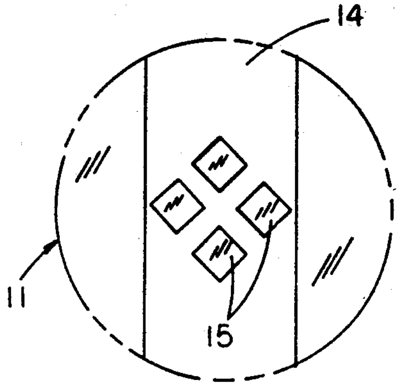
FIG. 2 is an enlarged orthographic view of section 2 as set forth in FIG. 1.
Figure 3:
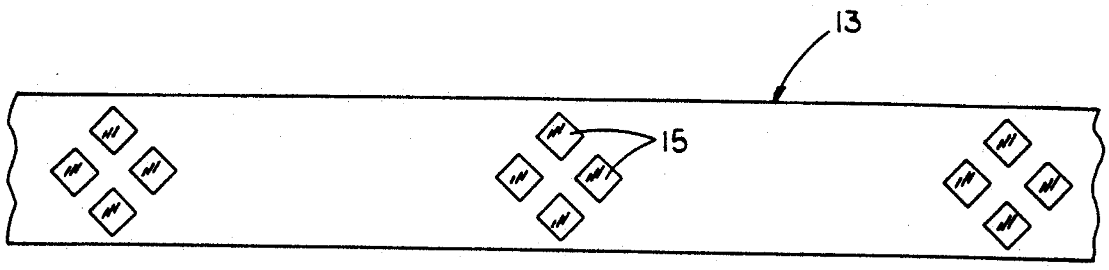
FIG. 3 is an orthographic view of a covering strip utilized by the invention.

With reference now to the drawings, and in particular to FIGS. 1 to 10 thereof, a new and improved wall covering embodying the principles and concepts of the present invention and generally designated by the reference numerals 10 and 10*a* will be described.

Figure 4:
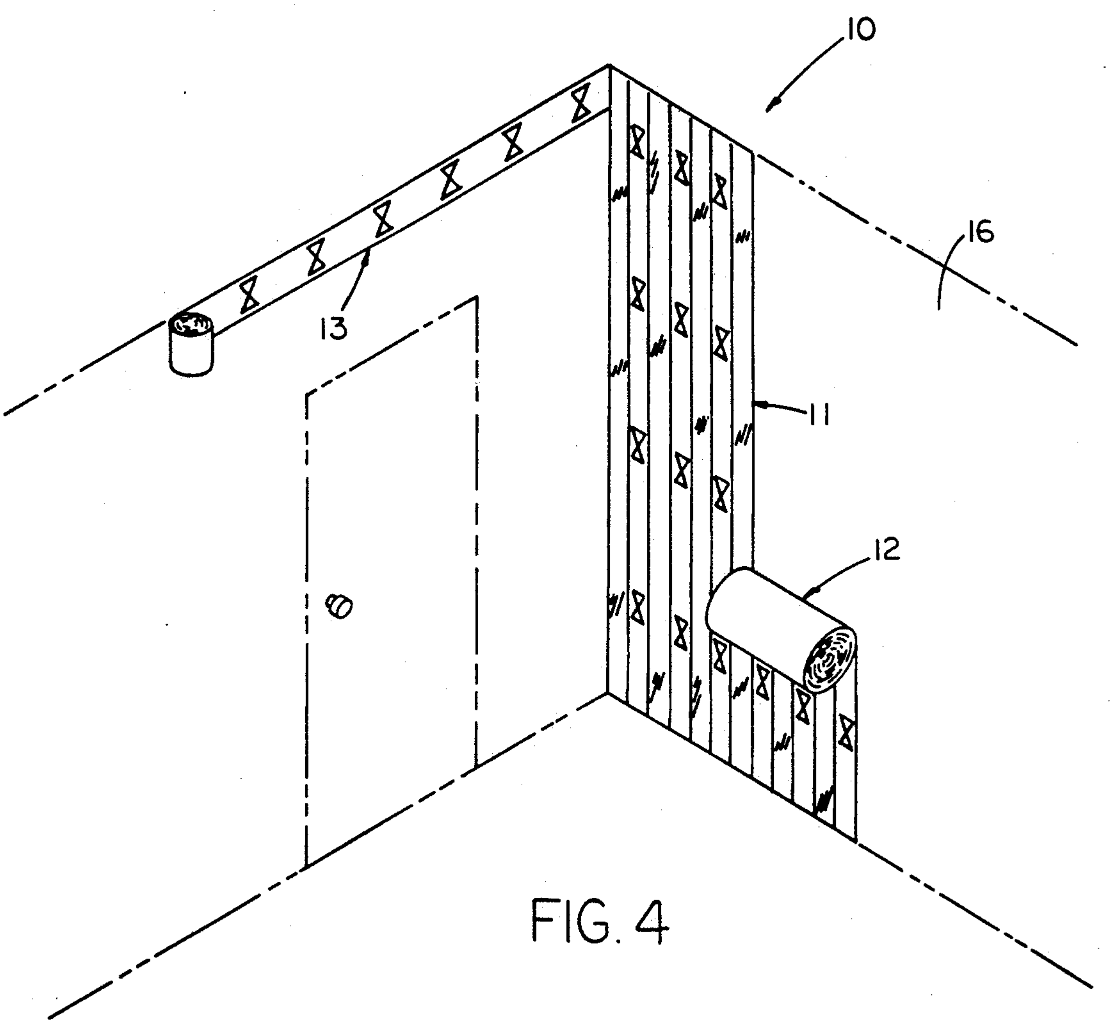
FIG. 4 illustrates the instant invention in use.

More specifically, the wall covering 10 of the instant invention essentially comprises a single flexible transparent panel 11 formed about a roll configuration 12 for mounting to an associated vertical wall surface 16, as illustrated in the FIG. 4. A border strip 13 is also provided and wherein the panels 11 each include opaque pattern portions 14, as well as transparent windows 15 directed through the opaque pattern portions 14 for viewing of a pattern of the existing wall surface 16 in concert with the opaque pattern portions 14. In this manner, a preexisting pattern of a wall surface 16 may be utilized in combination with the wall covering 10 of the instant invention to provide for a myriad of pattern configurations.

Figure 5:
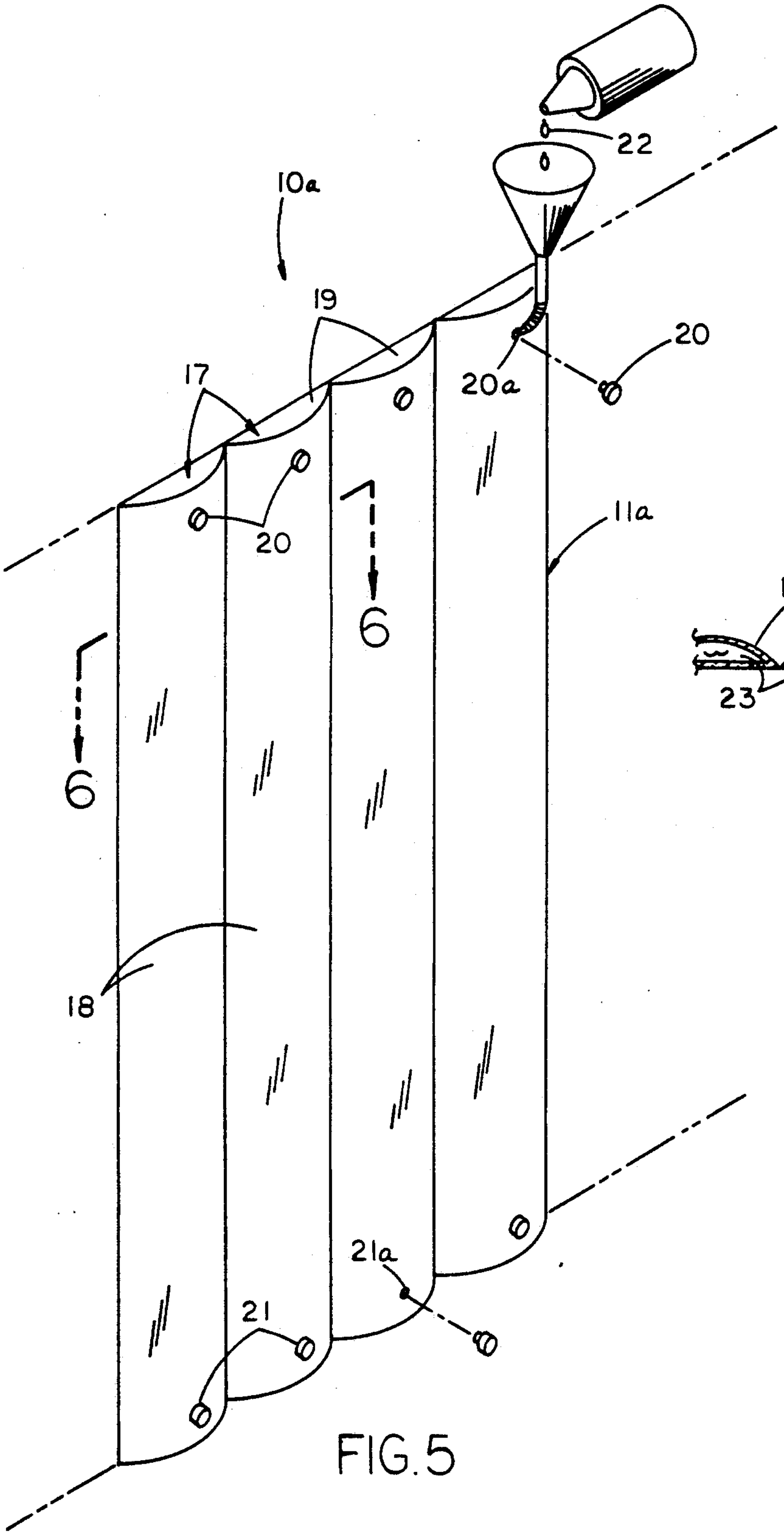
FIG. 5 is an isometric illustration of a modification of the invention.
Figure 6:
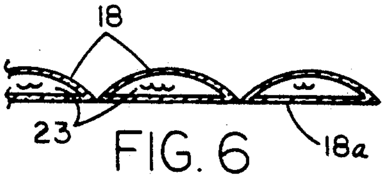
FIG. 6 is an orthographic view, taken along the lines 6—6 of FIG. 5 in the direction indicated by the arrows.
Figure 7:
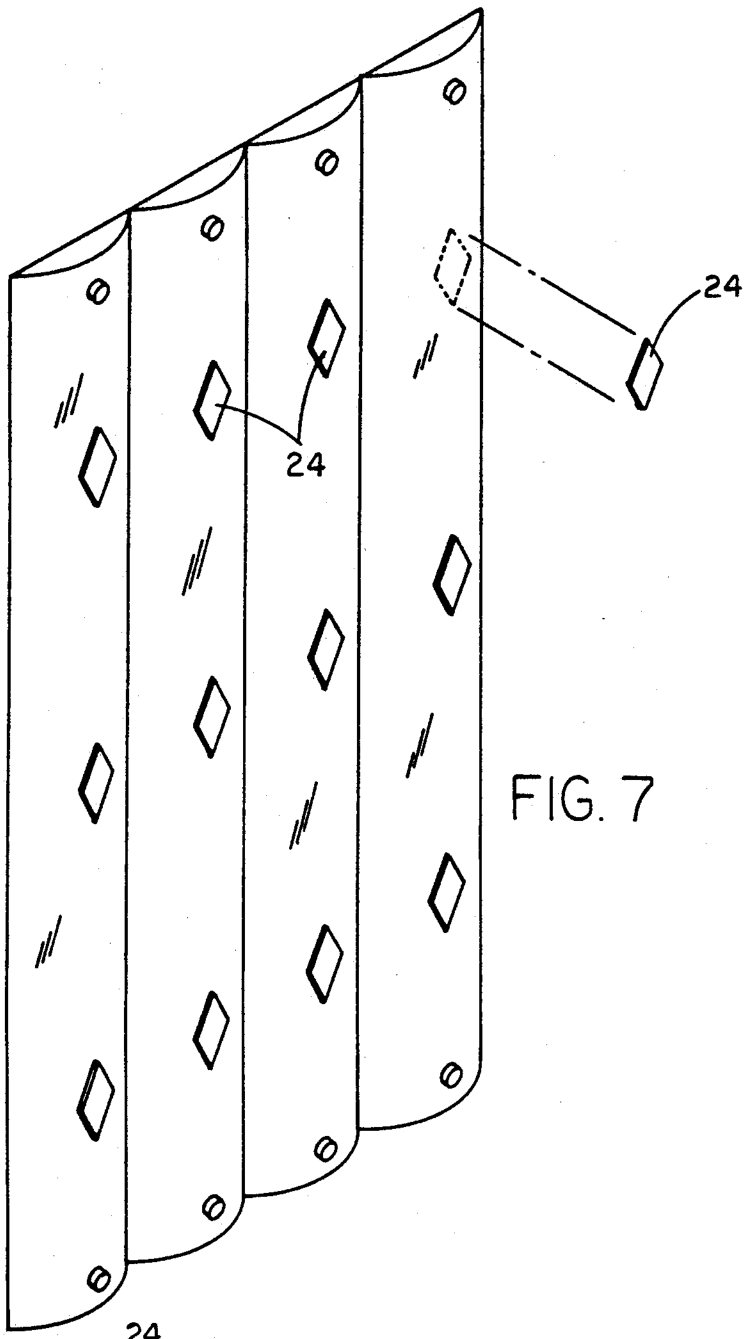
FIG. 7 is an isometric illustration of the modification of the invention utilizing photochromic panels positionable thereon.
Figure 8:
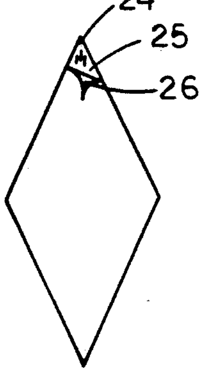
FIG. 8 is an orthographic rear view of the photochromic panel.
Figure 9:
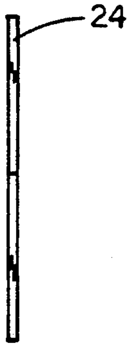
FIG. 9 is an orthographic side view of the photochromic panel.
Figure 10:
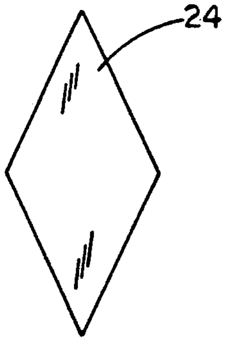
FIG. 10 is an orthographic front view of the photochromic panel.

The invention, as illustrated in the FIGS. 5 and 6, includes transparent vertical fluid reservoir containers 17 arranged coextensively along the modified panel 11*a*, wherein each of the reservoir containers 17 are arranged to include a front wall 18 and a top wall 19. A fill plug 20 is directed through the front wall 18 adjacent the top wall 19 to permit filling of each of the reservoirs with a colored fluid 22. A drain plug 21 is positioned adjacent a lower distal end of the front wall 18 of each reservoir container 17. The fill plugs and drain plugs are cooperative with respective fill and drain openings 20*a* and 21*a* to permit the selective filling and draining of fluids to vary the pattern within the transparent modified panels 11*a*. It should be noted that the front walls 18, as well as the rear wall 18*a* is of a transparent construction. The invention is further exemplified in the FIG. 7 utilizing photochromic plates 24 securably and selectively mounted to the front wall 18 utilizing a peel-away strip 26 exposing a clear adhesive 25 to a rear surface of each of the plates 24. In this manner, various patterns may be provided as the photochromic plates 24 will change in color intensity regarding available light. It should be further noted that the use of contrasting colored fluids 23 within the containers from the colored fluid source 22 permits the selective changing of the coloration of the panel structure 11*a* in combination with the existing pattern structure of the walls 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wall covering, comprising, a unitary flexible panel, the flexible panel formed of a transparent material said transparent material including discrete opaque portions, and the flexible panel including a flexible panel front wall, and the flexible panel front wall including the opaque pattern portions mounted thereon, and the flexible panel includes a top wall, and the front wall is spaced forwardly of a rear wall, the rear wall arranged coextensively with the front wall, and the front wall and the rear wall define a plurality of vertical fluid reservoir containers arranged coextensively along the flexible panel, wherein each reservoir container is arranged in a contiguous coextensive relationship relative to an adjacent reservoir container, and each reservoir container includes a fill opening, with a fill plug removably mounted relative to the fill opening and the fill opening is arranged adjacent the top wall, and a drain opening positioned through the front wall into the reservoir container adjacent a lower distal end of the front wall, with a drain plug removably mounted relative to the drain opening.

2. A wall covering as set forth in claim 1 wherein each reservoir container receives a colored fluid therewithin through the fill opening permitting selective drainage of the fluid through the drain opening.

3. A wall covering as set forth in claim 2 wherein the opaque pattern portions include photochromic plates, each photochromic plate is arranged for selective securement to the front wall, and wherein each photochromic plate includes a clear adhesive rear surface permitting selective securement of each photochromic plate relative to the front wall.

* * * * *